United States Patent [19]
Hollnagel

[11] 3,854,541
[45] Dec. 17, 1974

[54] SNOWMOBILE SKI SUSPENSION ASSEMBLY WITH HORIZONTAL SHOCK ABSORBER MEANS

[76] Inventor: Harold E. Hollnagel, 918 W. Laramie Ln., Milwaukee, Wis. 53022

[22] Filed: Mar. 16, 1973

[21] Appl. No.: 342,017

[52] U.S. Cl. .................. 180/5 R, 244/108
[51] Int. Cl. ......................... B62m 27/00
[58] Field of Search .............. 180/5 R; 244/108

[56] References Cited
UNITED STATES PATENTS

| | | | |
|---|---|---|---|
| 1,891,188 | 12/1932 | Stalb | 244/108 |
| 1,892,064 | 12/1932 | Markey | 244/108 |
| 3,613,812 | 10/1971 | Hetteen | 180/5 R |
| 3,623,564 | 11/1971 | Higginbotham | 180/5 R |
| 3,716,208 | 2/1973 | Fagan | 244/108 |

FOREIGN PATENTS OR APPLICATIONS

| 732,538 | 3/1943 | Germany | 244/108 |

*Primary Examiner*—Philip Goodman
*Attorney, Agent, or Firm*—McGlynn & Milton

[57] ABSTRACT

A ski suspension assembly including support means mounted to a ski, lever arm means pivotally attached to the support means for pivotal motion in response to motion between an attached member (the steering spindle) and the ski, bracket means mounted to the ski and spaced from the support means, and resilient means comprising a coil spring-shock absorber combination disposed between the lever arm means and the bracket means for resisting the pivotal motion of the lever arm means.

16 Claims, 4 Drawing Figures

SNOWMOBILE SKI SUSPENSION ASSEMBLY WITH HORIZONTAL SHOCK ABSORBER MEANS

This invention relates to a suspension assembly and one which is particularly adapted for supporting a snowmobile body over a snowmobile ski. Furthermore, on a broader scale, the basic components of the instant invention has application as a motion dampening assembly, such as, for example in a shock or energy absorbing system.

Referring to the snowmobile ski application of the instant invention, many modifications and improvements have been made in the general design and construction of snowmobiles since the advent of their popularity. One specific area which has received particular attention is the skis which not only support the front end of the snowmobile but are employed to steer the vehicle as well. Steering is facilitated by providing a pair of rotatable spindles which extend from the underside of the snowmobile, each of which is attached to a ski. The spindles are manually rotated with a handle bar-like member by the driver for controlling the direction of the skis. It has been found that the connection between the spindle and the ski requires some type of suspension apparatus to improve the operating characteristics of the snowmobile. For instance, when the snowmobile is traveling over rough terrain, a solid connection between the spindles and the skis subjects the snowmobile to excessive jarring and jolting.

It is noted that most popular ski suspension assemblies generally include a leaf-type spring which is attached at its ends to the ski. The rotatable spindle is secured by various means to the central portion or apex of the leaf spring. Excessive vertical movement of the ski, when the snowmobile is moving over rough terrain is thereby dampened or reduced by means of the leaf spring. Additionally, a shock absorber of some type, which is normally connected between the spindle and the ski is employed to reduce the spring back or recovery of the leaf spring to further improve the operating quality. In some cases, the shock absorber also prevents or reduces longitudinal flop of the ski so that, in the event that the snowmobile becomes airborne, the tips of the skis will not drop and become buried in the snow upon landing.

A few examples of the most recent developments in ski suspension assemblies are shown in the U.S. Pat. Nos. 3,613,812; 3,525,412, and 3,525,411.

The suspension assemblies which have heretofore been employed have certain drawbacks which make their use somewhat unattractive. Among the important operating criterion is the ability of the spindle to positively rotate the ski in a horizontal plane and another is to maintain the proper degree of camber on the skis. Both of these features are to some extent sacrificed by interposing a leaf spring between the spindle and the ski. The connection no longer has positive response due to the flexibility of the leaf spring. In other words, there is some lost motion between the spindle and the ski when the spindle is rotated due to the lack of rigidity in the connection.

Another problem is that a large number of parts are mounted above the leaf spring thereby positioning a substantial portion of the weight of the suspension assembly above the ski. This adds to the loss of stability and, in any event, detracts from the overall appearance of the ski assembly.

It is therefore an object and feature of the instant invention to provide a ski suspension assembly including support means mounted to a ski, lever arm means pivotally attached to the support means for pivotal motion in response to the motion between an attached member and the ski, bracket means mounted to the ski and spaced from the support means, and resilient means disposed between the lever arm means and the bracket means for resisting the pivotal motion of the lever arm means.

Another object and feature of the instant invention is to provide a suspension assembly wherein the path of motion of the attached member is in a first plane and is translated from the first plane to a second plane disposed at an obtuse angle to the first plane by the lever arm means.

Another object and feature of the instant invention is to provide a suspension assembly wherein the resilient means includes spring means for compression in response to the pivotal motion of the lever arm means in one direction and dampening means for reducing the rate of recover of the spring means.

In accordance with the foregoing object and feature, another object and feature of the instant invention is to provide a suspension assembly wherein the resilient means includes a coil spring member and a piston-type shock absorber member.

Other objects and features of the instant invention will be readily appreciated as the same becomes better understood by reference to the following detailed description when considered in connection with the accompanying drawing wherein.

Figure 1:
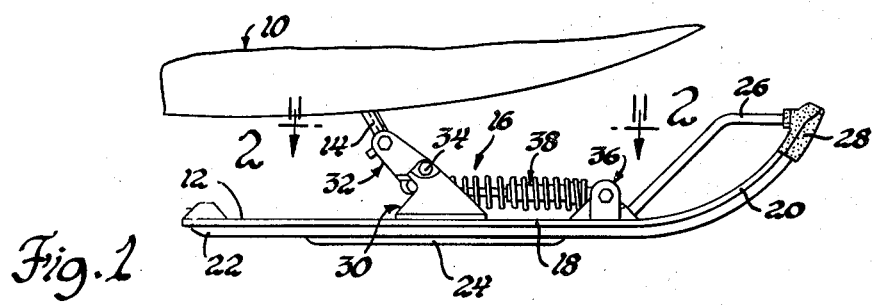
FIG. 1 is a side elevational view of a snowmobile ski attached to the spindle of a snowmobile and including the ski suspension assembly constructed in accordance with the instant invention.
Figure 2:
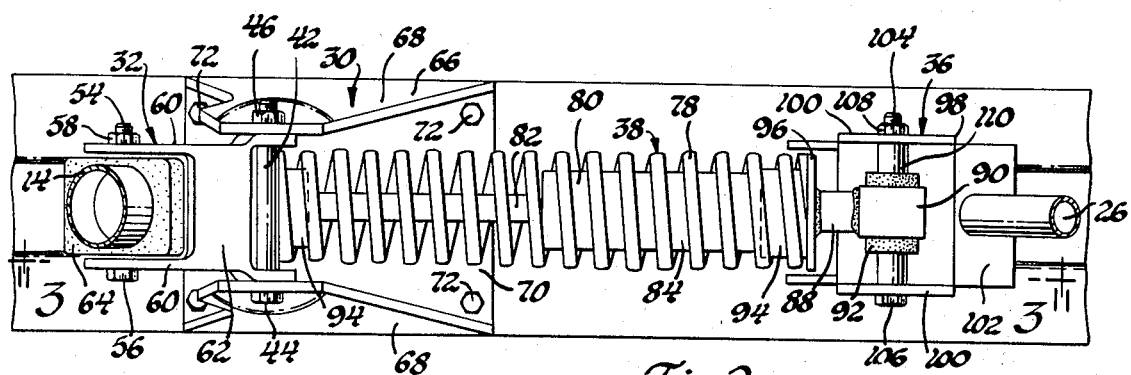
FIG. 2 is an enlarged fragmentary plan view taken generally along line 2—2 of FIG. 1.

Referring to the drawings, a cut away portion of the underside of the snowmobile body is generally indicated at 10. A snowmobile ski 12 is attached to the rotatable steering spindle 14 by means of the ski suspension assembly generally shown at 16. As shown in the various drawings the general construction of the ski 12 includes a generally flat body section 18 terminating at its forward end in an upwardly curving tip 20. The body section 18 includes a recessed channel 22 depending therefrom and having a runner 24 attached thereto. The channels 22 and the runner 24 facilitate steering of the snowmobile in that these elements bite or dig into the snow or ice as the ski is turned thereby changing the direction of the snowmobile.

Generally speaking, the ski suspension assembly 16 includes support means generally indicated at 30 which is mounted to the ski 12 and lever arm means generally indicated at 32 pivotally attached to the support means 30 at 34. The lever arm means 32 is connected to an attached member; specifically, the spindle 14, and is subject to pivotal motion in response to the motion between the ski 12 and the attached member 14 or spindle. A bracket means generally indicated at 36 is mounted to the ski 12 and is spaced forwardly from the support means 30. A resilient means generally indicated at 38 is disposed between the lever arm means 32 and the bracket means 36 for resisting the pivotal motion of the lever arm means 32.

In other words, as the snowmobile moves over rough terrain, the ski 12 oscillates in a horizontal plane, which oscillation causes the lever arm means 32 to pivot on the support means 30, the pivotal motion being resisted by the resilient means 32. The motion of the spindle 14 relative to the ski 12 is in a plane which is slightly offset from the perpendicular with respect to the ski; however, the motion is translated from the first plane to the resilient means 38 which is substantially horizontal with respect to the ski through the lever arm means 32. The effect, therefore, is to translate the motion from a first plane to a second plane disposed at an obtuse angle to the first plane. The beneficial result from the change in direction is that a greater range of motion in the suspension assembly is permitted without increasing the height of the assembly over the ski 12.

In terms of specific construction, the lever arm means 32 includes a lever arm 40 having pivot shaft means 42 for pivotally connecting the lever arm 40 to the support means 30. The pivot shaft means 42 comprises a bolt 44 having an elongated shank. The bolt 44 is secured in place by means of a nut 46. The lever arm means 40 further includes first connecting means comprising a journal shaft member 48 for connecting the lever arm 40 to the resilient means 38. The journal shaft member 48 includes a bolt 50 having an elongated shank and which is secured in place by means of a nut 52. The lever arm means 40 also includes second connecting means comprising a pivot shaft 54 for pivotally connecting the attached member or spindle 14 thereto. The pivot shaft 54 is comprised of a bolt 56 having an elongated shaft secured in place by a nut 58.

The pivot shaft means 42 is disposed intermediate the first and second connecting means (the journal shaft 48 and the pivot shaft 54) and is laterally offset from the path of motion of the spindle 14. The disposition of parts causes compression of the resilient means 38 when the lever arm 40 is pivoted by the motion of the spindle 14 as it approaches the ski 12.

The lever arm 40 is preferably constructed of two substantially parallel spaced apart, side members 60 which are joined together by a connection 62 comprising a metal plate welded between the side members 60. Alternatively, the lever arm 40 could be made of a one piece casting or a metal stamping. Each of the side members includes openings for receiving the ends of the pivot shaft members 42 and 54 and the journal shaft member 48.

The lever arm 40 also includes resistance means for resisting flop of the ski, that is, the pivotal movement of the ski 12 in a horizontal plane with respect to the spindle 14. This is to prevent the tip 20 of the ski 12 from dropping when the snowmobile is airborne, as hereinbefore stated. The resistance means may include a grommet-type member 64 which is disposed on the terminal end of the spindle 14. The grommet-type member 64 is made of a rubber material so that it frictionally engages the pivot shaft member 54 to inhibit rotational movement about this axis. Alternatively, flop of the ski 12 may be prevented by adapting the metal plate connection 62 to engage the grommet-type member 64 of the spindle 14 directly. In this manner, the tip of the ski 12 is prevented from dropping below the horizontal when the snowmobile is airborne.

The support means 30 comprises a lever arm support bracket 66 for supporting the pivot shaft 42 in which the lever arm 40 pivots. The support bracket 66 includes two, spaced-apart, upstanding wall members 68 which are joined along their lower edges by a base member 70. The wall members include suitable openings for receiving the ends of the pivot shaft 42 and supporting the same therein. The base member 70 includes means for securing the support bracket 66 to the ski 12. Specifically, the securing means includes a plurality of openings for receiving nut and bolt fasteners 72. Alternatively, the base member 70 may be welded to the ski 12 or secured thereto by any other desirable means.

Figure 3:
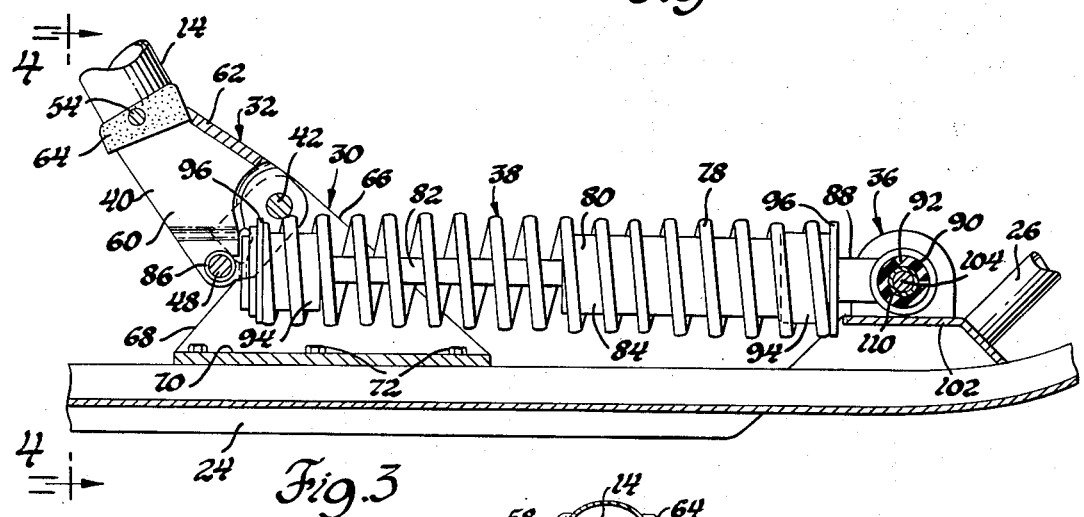
FIG. 3 is a cross-sectional side elevational view taken generally along line 3—3 of FIG. 2.
Figure 4:
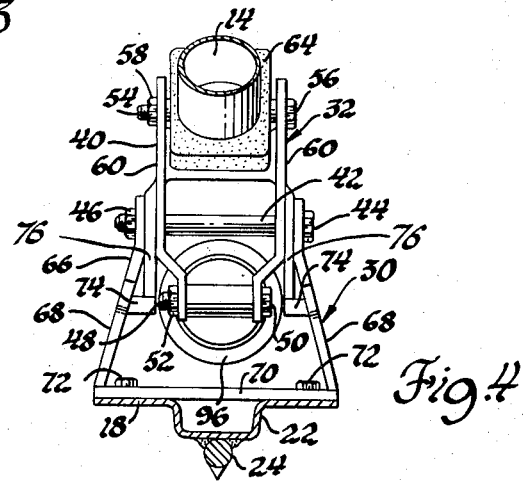
FIG. 4 is a rear elevational view taken generally along line 4—4 of FIG. 3.

Stop means is provided for limiting the pivotal motion of the lever arm 40 in response to the outward extension of the resilient means 38. In other words, the resilient means 38 is subjected to a small amount of precompression which precompression is maintained by the stop means. The stop means includes inwardly extending stop members 74 or tabs disposed on the inner side of the wall member 68 of the support bracket 66. The stop members 74 engage a pair of depending leg members 76 which extend downwardly from the lever arm 40. The clockwise pivotal motion of the lever arm 40, as viewed in FIG. 3, is thereby limited by the engagement of the leg members 76 with the stop members 74, as shown in FIG. 4.

The resilient means preferrably includes spring means for compression in response to the pivotal motion of the lever arm 40 in one direction and dampening means for reducing the rate of recovery of the spring means. For this purpose the resilient means 38 includes spring means in a form of a coil spring member 78 and dampening means in the form of a piston-type shock absorber 80. It is noted, however, that the invention is not limited to the specific combination described. The resilient means 38 under certain circumstances, may adequately function with only the coil spring 78. It is considered preferable, however, to include both the coil spring 78 and the shock absorber 80 to provide optimum operating characteristics.

The shock absorber 80 contemplated for use in the resilient means 38 is preferrably of a construction as disclosed in a copending patent application Ser. No. 296,471 filed Oct. 10, 1972 by Harold S. Hollengal. The shock absorber 80, therefore, includes a moveable rod portion 82 and a cylinder portion 84. A friction member (not shown) is disposed on the rod portion 82 within the cylinder portion 84. As described in the above identified patent application the resistance of the shock absorber may be adjusted by rotation of the relative parts, that is, rotating the rod portion 82 with respect to the cylinder portion 84 changes the frictional engagement of the friction member. This feature allows the stiffness of the suspension assembly 16 to be adjusted depending upon the contemplated use. For example, a stiffer suspension is more desirable when the snowmobile is used in competition than merely for pleasure.

The rod portion 82 of the shock absorber 80 includes connecting rod means 85 having a journal bearing member 86 at the terminal end thereof which is rotatably disposed about the journal shaft member 48 on the lever arm 40. Similarly, the cylindrical portion 84 includes connecting rod means 88 having a journal bearing member 90 at the terminal end thereof. The latter identified journal bearing member 90 also includes an internal rubber bushing 92.

The resilient means 38 further includes spring retainer means 94 for retaining the coil spring 78 on the shock absorber 80. One of the spring retaining means 94 is welded to the end of the rod portion 82 of the shock absorber 80 and the other is welded to the end of the cylinder portion 84 thereof. Each of the spring retainer means 94 includes an outwardly extending annular flange 96 which is adapted for abutting engagement with the coil spring 78. The result, therefore, is that after coil spring 78 is compressed by pivotal motion of the lever arm 40 the recovery or extension thereof is substantially retarded by the action of the shock absorber 80.

The bracket means 36 includes a shock absorber support bracket 98 having two parallel, spaced apart, upstanding wall members 100 which are welded to a platform 102 on the ski 12. Each of the wall members 100 includes an opening for receiving one end of a journal shaft member 104. The journal shaft member 104 includes a bolt 106 having an elongated shank and which is held in place by a nut 108. The journal shaft member 104 also includes a rotatable sleeve 110 which is surrounded by the rubber bushing 92 of the journal bearing member 90 of the shock absorber 80.

The rotatable connection consisting of the journal bearings at each end of the shock absorber 80 permits rotation about these axes. Some rotation is required because the journal bearing member 48 follows a generally arcuate path when the lever arm 40 is pivoted.

The ski suspension assembly as described above represents a substantial improvement over ski suspension assemblies heretofore in use because it affords the advantages of a rigid connection between the spindle and ski while providing superior shock absorption characteristics. More specifically, the ski suspension assembly of the instant invention provides positive response to the rotation of the spindle as well as accurate maintenance of the degree of camber on the ski. Furthermore, the use of a coil spring in place of a leaf spring allows substantially greater movement of the suspension parts as well as affording the advantage of the smooth action of a coil spring in contrast with a leaf spring. Additionally, the simplicity of the design and the relatively few number of parts afford a substantial economic saving. It is also noted that the instant invention provides a ski suspension assembly which has both better appearance and improved handling over those assemblies heretofore in use.

The invention has been described in an illustrative manner, and it is to be understood that the terminology which has been used is intended to be in the nature of words of description rather than of limitation.

Obviously, many modifications and variations in the instant invention are possible in light of the above teachings. It is, therefore, to be understood that the invention may be practiced otherwise than as specifically described and yet remain within the scope of the depending claims.

The embodiments of the instant invention in which an exclusive property or privilege is claimed are defined as follows:

1. A suspension assembly comprising: bracket-support means, lever arm means attached for pivotal movement to said bracket-support means, said lever arm means being attached to said bracket-support means at a point lying between the end of said lever arm means, stop means for limiting the pivotal motion of said lever arm means in a first direction, and resilient means for resisting pivotal motion of said lever arm means in a second direction and for continuously urging said lever arm means in said first direction toward said stop means.

2. An assembly as set forth in claim 1 wherein said stop means includes a stop member disposed on said bracket-support means and a member on said lever arm means for engaging said stop member.

3. An assembly as set forth in claim 2 wherein said resilient means includes a coil spring member supported between said lever arm means and said bracket-support means.

4. An assembly as set forth in claim 3 wherein said resilient means includes shock absorbing means for resisting pivotal motion of said lever arm means.

5. An assembly as set forth in claim 4 wherein said shock absorbing means includes a piston-type shock absorber.

6. An assembly as set forth in claim 5 wherein said shock absorbing means is pivotally connected to said bracket-support means at one end thereof and is pivotally connected to said lever arm means at the other end thereof.

7. An assembly as set forth in claim 6 wherein said lever arm means includes attachment means for pivotally attaching the same to a member.

8. An assembly as set forth in claim 7 wherein said attachment means includes means for resisting the pivotal movement between said lever arm means and said member.

9. A suspension assembly for a ski comprising: bracket-support means adapted for attachment to a ski, lever arm means attached for pivotal movement to said bracket-support means including attachment means for pivotally attaching a supported member thereto, said lever arm means being attached to said bracket-support means at a point lying between the ends of said lever arm means, stop means for limiting the pivotal motion of said lever arm means in a first direction, and resilient means for resisting pivotal motion of said lever arm means in a second direction and for continuously urging said lever arm means in said first direction toward said stop means.

10. An assembly as set forth in claim 9 wherein said stop means includes a stop member disposed on said bracket-support means and a member on said lever arm means for engaging said stop member.

11. An assembly as set forth in claim 10 wherein said resilient means includes a coil spring member supported between said lever arm means and said bracket-support means.

12. An assembly as set forth in claim 11 wherein said resilient means includes shock absorbing means for resisting the pivotal motion of said lever arm means.

13. An assembly as set forth in claim 12 wherein said shock absorbing means includes a piston-type shock absorber.

14. An assembly as set forth in claim 13 wherein said shock absorbing means is pivotally connected to said bracket-support means at one end thereof and is pivotally connected to said lever arm means at the other end thereof.

15. An assembly as set forth in claim 14 wherein said lever arm means includes attachment means for pivotally attaching the same to a member.

16. An assembly as set forth in claim 15 wherein said attachment means includes means for resisting the pivotal movement between said lever arm means and said member.

* * * * *